United States Patent
Shah et al.

(10) Patent No.: US 10,926,173 B2
(45) Date of Patent: Feb. 23, 2021

(54) CUSTOM VOICE CONTROL OF VIDEO GAME CHARACTER

(71) Applicant: Electronic Arts Inc., Redwood City, CA (US)

(72) Inventors: Dhaval Hemant Shah, Redwood City, CA (US); Igor Borovikov, Foster City, CA (US); Mohsen Sardari, Redwood City, CA (US); John Kolen, Foster City, CA (US); Navid Aghdaie, San Jose, CA (US); Kazi Atif-Uz Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/436,811

(22) Filed: Jun. 10, 2019

(65) Prior Publication Data

US 2020/0384362 A1 Dec. 10, 2020

(51) Int. Cl.
*A63F 13/00* (2014.01)
*A63F 13/424* (2014.01)
*A63F 13/63* (2014.01)
*A63F 13/215* (2014.01)

(52) U.S. Cl.
CPC .......... *A63F 13/424* (2014.09); *A63F 13/215* (2014.09); *A63F 13/63* (2014.09)

(58) Field of Classification Search
None
See application file for complete search history.

(56) References Cited

U.S. PATENT DOCUMENTS

| | | |
|---|---|---|
| 7,266,495 B1 | 9/2007 | Beaufays et al. |
| 7,369,997 B2 | 5/2008 | Chambers et al. |
| 7,467,087 B1 | 12/2008 | Gillick et al. |
| 8,443,288 B2 | 5/2013 | Mercs |
| 9,582,246 B2 | 2/2017 | Klein et al. |
| 9,685,156 B2 | 6/2017 | Borjeson et al. |
| 9,741,339 B2 | 8/2017 | Peng et al. |
| 10,134,390 B2 | 11/2018 | Shin |
| 10,152,965 B2 | 12/2018 | Bruguier et al. |
| 10,449,440 B2 | 10/2019 | Sardari et al. |
| 10,621,317 B1 | 4/2020 | Sardari et al. |

(Continued)

FOREIGN PATENT DOCUMENTS

| | | |
|---|---|---|
| JP | 2004-061843 A | 2/2004 |
| KR | 10-2016-0030943 A | 3/2016 |
| WO | WO 2016/111881 A1 | 7/2016 |

*Primary Examiner* — Paul A D'Agostino
(74) *Attorney, Agent, or Firm* — Knobbe, Martens, Olson & Bear, LLP

(57) ABSTRACT

Systems and methods are disclosed for enabling a player of a video game to designate custom voice utterances to control an in-game character. One or more machine learning models may learn in-game character actions associated with each of a number of player-defined utterances based on player demonstration of desired character actions. During execution of an instance of a video game, current game state information may be provided to the one or more trained machine learning models based on an indication that a given utterance was spoken by the player. A system may then cause one or more in-game actions to be performed by a non-player character in the instance of the video game based on output of the one or more machine learning models.

16 Claims, 5 Drawing Sheets

(56) References Cited

U.S. PATENT DOCUMENTS

| | | |
|---|---|---|
| 10,629,192 B1 | 4/2020 | Streat |
| 2004/0266527 A1 | 12/2004 | Anderson et al. |
| 2006/0040718 A1* | 2/2006 | Davis ................. A63F 13/10 463/9 |
| 2007/0244751 A1 | 10/2007 | Zalewski et al. |
| 2008/0147404 A1 | 6/2008 | Liu et al. |
| 2010/0145704 A1 | 6/2010 | Conkie et al. |
| 2011/0086712 A1 | 4/2011 | Cargill |
| 2011/0212783 A1 | 9/2011 | Dale et al. |
| 2013/0031275 A1 | 1/2013 | Hanes |
| 2013/0090169 A1 | 4/2013 | Liu et al. |
| 2013/0315406 A1 | 11/2013 | Choi et al. |
| 2013/0325474 A1 | 12/2013 | Levien et al. |
| 2014/0128144 A1 | 5/2014 | Bavitz et al. |
| 2014/0163980 A1* | 6/2014 | Tesch ................. G10L 25/57 704/235 |
| 2014/0164507 A1* | 6/2014 | Tesch ................. H04L 51/10 709/204 |
| 2014/0181929 A1 | 6/2014 | Zheng et al. |
| 2015/0019216 A1 | 1/2015 | Singh et al. |
| 2015/0019540 A1 | 1/2015 | Ganjam et al. |
| 2015/0035937 A1 | 2/2015 | Ota |
| 2015/0111640 A1 | 4/2015 | Zheng |
| 2015/0248886 A1 | 9/2015 | Sarikaya et al. |
| 2015/0310854 A1* | 10/2015 | Takemura ............. G06F 40/30 704/254 |
| 2015/0310897 A1* | 10/2015 | Ko ...................... H04N 5/93 386/230 |
| 2015/0324458 A1* | 11/2015 | Kurisu ................. G06F 3/048 707/722 |
| 2015/0347912 A1* | 12/2015 | Rodzevski ........... G01P 15/02 706/11 |
| 2016/0203002 A1 | 7/2016 | Kannan et al. |
| 2017/0052760 A1 | 2/2017 | Johnson et al. |
| 2017/0110128 A1* | 4/2017 | Zhang ................. G10L 15/22 |
| 2017/0169829 A1 | 6/2017 | Celikyilmaz et al. |
| 2017/0171594 A1* | 6/2017 | Huang ............. H04N 21/42203 |
| 2017/0177140 A1* | 6/2017 | Lee ................... G06F 21/32 |
| 2017/0178622 A1* | 6/2017 | Ishikawa ............. G10H 1/361 |
| 2017/0193992 A1* | 7/2017 | Wang ................. G10L 15/22 |
| 2018/0068656 A1* | 3/2018 | Lehman ............. G10L 15/22 |
| 2018/0243657 A1* | 8/2018 | Kulavik ............. A63F 13/87 |
| 2018/0286276 A1* | 10/2018 | Lee ................... G06F 3/011 |
| 2019/0009181 A1* | 1/2019 | Kroyan ............. A63H 3/28 |
| 2019/0027131 A1 | 1/2019 | Zajac, III |
| 2019/0103106 A1* | 4/2019 | Boeda ............. G06F 40/211 |
| 2020/0101383 A1* | 4/2020 | Hwang ............. A63F 13/537 |
| 2020/0129851 A1 | 4/2020 | Sardari et al. |
| 2020/0251089 A1 | 8/2020 | Pinto |

* cited by examiner

CUSTOM VOICE CONTROL OF VIDEO GAME CHARACTER

INCORPORATION BY REFERENCE TO ANY PRIORITY APPLICATIONS

Any and all applications for which a foreign or domestic priority claim is identified in the Application Data Sheet as filed with the present application are hereby incorporated by reference.

BACKGROUND

Video games often include both player-controlled characters and non-player characters (NPCs). A player traditionally controls his or her player-controlled character in a video game through commands provided via a game controller (such as a controller with buttons, a directional pad, a joystick, and/or other physical control mechanisms), a keyboard, a mouse, or a touchscreen. Some video games additionally or alternatively enable a player to provide control commands via motion or voice. For example, some video games are designed in a manner whereby a particular in-game action is mapped to a particular hand gesture or body motion of a player that may be captured by a motion sensing input device and translated to an in-game action by code of the game. Alternatively, some video games provide a player with a list of certain voice commands that are recognized by the game in order to control an in-game character. In existing video game systems, such voice commands and the associated in-game actions are typically defined in advance by game designers, and are typically used to control a player-controlled character.

SUMMARY OF EMBODIMENTS

The systems, methods, and devices of this disclosure each have several innovative aspects, no single one of which is solely responsible for the all of the desirable attributes disclosed herein.

In some embodiments, a system may include a data store that stores player interaction data associated with control by a player of one or more characters in a video game. The system may further include a computing system in electronic communication with the data store and configured to execute computer-readable instructions that configure the computing system to: retrieve player interaction data from the data store as at least a portion of training data for one or more machine learning models, wherein the training data identifies utterances spoken by a player of the video game and further comprises game information associated with each of a plurality of instances in which the player spoke at least a first utterance while controlling an in-game character in the video game, wherein the game information associated with each individual instance of the first utterance comprises at least (a) control input received, subsequent to the individual instance of the first utterance, from a control device of the player and (b) associated game state information when the first utterance was spoken in the individual instance; train the one or more machine learning models to learn in-game character actions associated with the first utterance based on the training data, wherein the in-game character actions learned by the one or more machine learning models for the first utterance differ between at least two different game states; subsequent to training the one or more machine learning models, execute an instance of the video game, wherein the player controls a first character in the instance of the video game using a first control device, wherein a second character in the instance of the video game is controlled by the system as a non-player character; during execution of the instance of the video game, receive indication that the first utterance is spoken by the player; based on the first utterance spoken by the player, provide at least current game state information as input to the one or more machine learning models; determine at least one in-game action to be performed by the second character in the instance of the video game based on output of the one or more machine learning models; and cause the second character in the instance of the video game to perform the at least one in-game action.

The computer system above can have one, all, or any combination of the following features. The one or more machine learning models may include a first model and a second model, wherein the first model is trained to associate an immediate in-game action with the first utterance, wherein the second model is trained to infer a goal associated with the first utterance. The at least one in-game action to be performed by the second character in the instance of the video game based on the output of the one or more machine learning models may be a series of actions to be performed by the second character to accomplish an inferred goal determined by the second model. The second model may be based at least in part on an inverse reinforcement learning algorithm. The control device may include at least one of a game controller, a keyboard or a mouse.

In some embodiments of the above system, the instance of the video game may include a plurality of characters that are controlled by the system as non-player characters, and the computing system may be further configured to determine that the first utterance applies to the second character based on a portion of the utterance. The second character in the above system may be a team member of a team that includes the first character within the instance of the video game. In some embodiments, causing the second character in the instance of the video game to perform the at least one in-game action may include causing the second character to behave similarly to behavior of a player-controlled character as captured in the training data.

In some embodiments, a computer-implemented method may include, under the control of a computer system comprising computer hardware, the computer system configured with computer executable instructions: obtaining training data for one or more machine learning models, wherein the training data comprises game information associated with each of a plurality of instances in which a player of a video game spoke at least a first utterance while controlling an in-game character in the video game, wherein the game information associated with each individual instance of the first utterance comprises at least one of control input received from a control device of the user or an in-game action performed by the in-game character subsequent to the individual instance of the first utterance, and wherein the game information further includes data representing a game state when the first utterance was spoken in the individual instance; training the one or more machine learning models to learn in-game character actions associated with the first utterance based on the training data; subsequent to training the one or more machine learning models, executing an instance of the video game, wherein the player controls a first character in the instance of the video game using a first control device, wherein a second character in the instance of the video game is a non-player character that is primarily controlled without player input; during execution of the instance of the video game, receiving indication that the first utterance is spoken by the player; based on the first utterance spoken by the player, providing at least current game state information as input to the one or more machine learning models; determining at least one in-game action to be performed by the second character in the instance of the video game based on output of the one or more machine learning models; and causing the second character in the instance of the video game to perform the at least one in-game action.

The above computer-implemented method may further include one, all, or any combination of the following features. The method may further include executing a training environment within the video game, wherein the training environment presents simplified game states for player interaction, and wherein the training data is collected based on control input and utterances received from the player with the training environment. The method may further include: receiving feedback from the player regarding whether the at least one in-game action performed by the second character was desired by the player when speaking the first utterance; and updating at least one of the one or more machine learning models based on the feedback. In some embodiments, the one or more machine learning models may be trained to control one or more non-player characters in response to each of a plurality of utterances, such as one or more vocal sounds determined by the player and conveyed to the one or more machine learning models based in part on the player speaking the plurality of utterances during a training phase. In some embodiments, executing the instance of the video game may include executing a hosted instance of the video game, wherein an application host system interacts with a game application executed on a computing device utilized by the player.

In some embodiments, a non-transitory computer-readable storage medium may have stored thereon computer-readable instructions that, when executed, configure a computing system to perform operations. The operations may include: training one or more machine learning models to learn in-game character actions associated with each of a plurality of player-defined utterances; subsequent to training the one or more machine learning models, executing an instance of a video game, wherein a player controls a first character in the instance of the video game using a first control device, wherein a second character in the instance of the video game is a non-player character that is primarily controlled without player input; during execution of the instance of the video game, receiving indication that a first utterance is spoken by the player, wherein the first utterance is one of the plurality of player-defined utterances; based on the first utterance spoken by the player, providing at least current game state information of the instance of the video game as input to the one or more machine learning models; determining at least one in-game action to be performed by the second character in the instance of the video game based on output of the one or more machine learning models; and causing the second character in the instance of the video game to perform the at least one in-game action in response to the first utterance.

The computer-readable medium above may further include one, all, or any combination of the following features. The one or more machine learning models may include a first model and a second model, wherein the first model is a classifier that maps each of the plurality of utterances to different in-game actions that are dependent on an associated game state, wherein the second model is an inverse reinforcement learning model configured to determine a series of in-game actions to reach an inferred goal associated with a given utterance. The second character may be a team member of a team that includes the first character within the instance of the video game. The operations may further include executing a training environment within the video game, wherein the training environment presents simplified game states for player interaction, and wherein training data for training the one or more machine learning models is collected based on control input and utterances received from the player with the training environment. The operations may further include: receiving feedback from the player regarding whether the at least one in-game action performed by the second character was desired by the player when speaking the first utterance; and updating at least one of the one or more machine learning models based on the feedback.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Overview

Figure 1:
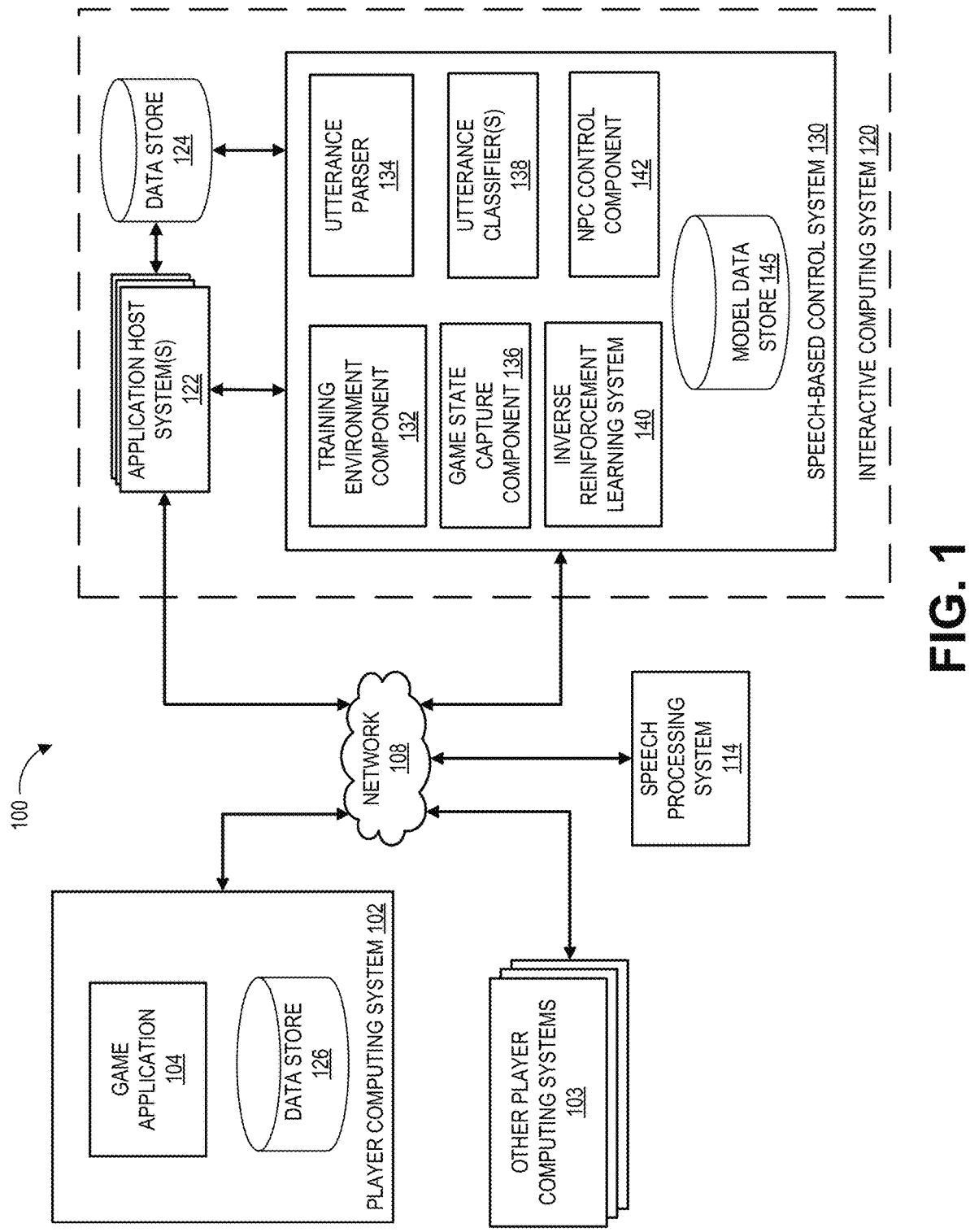
FIG. 1 illustrates an embodiment of a networked computing environment for implementing one or more embodiments of a speech-based control system for learning and executing actions with respect to a non-player character in a video game based on custom spoken commands.

Aspects of the present disclosure relate to enabling a player of a video game to designate custom voice utterances to control an in-game character within the video game. One or more machine learning models of a voice or speech-based control system may learn in-game character actions associated with each of a number of player-defined utterances based on player demonstration of desired character actions. During execution of an instance of a video game, current game state information may be provided to the one or more trained machine learning models based on an indication that a given utterance was spoken by the player. The speech-based control system may then cause one or more in-game actions to be performed by a non-player character (NPC) in the instance of the video game based on output of the one or more machine learning models. For example, the NPC that reacts to the player's voice command or other utterance may be a teammate or other character that cooperates with the player-controlled character within the game.

In some embodiments, a voice-based or speech-based control system for one or more video games, as will be further described below, may include or implement machine learning models that learn to associate controller input in the context of a given game state with the player's voice input to generate immediate actions and/or execute short term goals via a NPC within the game. After the machine learning model(s) are trained, a particular utterance or other voice input from the player may trigger the machine learning model(s) to determine one or more in-game actions similar to those observed by the model(s) during training in association with the given utterance and similar game states. In some embodiments, the association of utterances with in-game character actions may occur at two tiers or levels, each of which may be implemented by a different machine learning model. For example, a first tier may be for immediate commands or atomic actions (e.g., "duck" or "jump"). A second tier may be for short term higher-level goals (such as "go around the building and attack"). A first tier classifier may map utterances to an emulated controller signal or specific in-game commands. A second tier model may rely on an inverse reinforcement learning (IRL) algorithm. For example, an IRL model may provide a set of likely goals at each moment of time and may be used to trigger a sequence of atomic actions to be performed by an NPC as previously learned from the player in a similar context or game state, as will be further described below.

Many video games include software-controlled virtual entities or characters, in addition to player-controlled virtual entities or characters. In video games, these software-controlled or programmatically controlled virtual entities may sometimes be referred to as computer players, bots, artificial intelligence ("AI") units, AI characters, or NPCs. NPCs can be programmed to respond to in-game stimuli (such as in game actions or occurrences involving other NPCs or player-controlled characters) in a manner that appears realistic to a human player. Traditionally, the behavior for a given NPC is typically programmed in advance as part of the game development process. However, aspects of the present disclosure include improved NPC behavior modeling in response to voice commands from a player, who may have previously demonstrated the player's desired NPC behavior for the given voice command.

As used herein, a game state may generally refer to data regarding the state of a game at a given snapshot instant, and may include different information depending on the type of game and manner in which the game's environment is represented in computer memory. Game state information can include game data such as character states, character actions, environment states, positional information about objects and/or characters in the game, non-positional information about characters and/or objects in the game, speeds, directions, health and other attributes, game modes, levels, and/or other information associated with a runtime state of a game application. For example, game state information may include, for each of potentially many virtual characters interacting in a virtual world (such as both player-controlled characters and NPCs), a character position, character orientation, current character action, attributes, and/or other information contributing to a state of a game application. The game state information can include dynamic state information that continually changes, such as character movement positions, and static state information, such as the identification of a game level or map within the game. In some embodiments, at least a portion of the game state information can be updated on a periodic basis, such as multiple times per second. In some embodiments, the game state information can be updated on an event-based basis. In some embodiments, game state information may be maintained asynchronously between individual player computing systems and a server that periodically sends updates to the player computing systems regarding game state information reflecting in-game actions of the various other players.

While NPC control features described herein are described with respect to speech utterances triggering custom non-player character behavior, speech is intended as an example of a non-traditional input mechanism that may utilized for such commands while the player provides primary control input for his player-controlled character via a traditional game control mechanism (such as a game controller, keyboard, mouse, touchscreen, etc.). It will be appreciated that other input mechanisms, such as gestures, could be used in other embodiments in place of speech utterances. For example, rather than a player selecting to train the systems described herein to perform a particular NPC action in response to the player speaking the command "jump," the player may choose to train the systems described herein to perform the same NPC action in response to the player performing a gesture or movement with his hand or other body part (such as pointing up with his index finger in the air). Such gestures may be recognized using any of a variety of known motion sensing input devices and/or cameras. In such embodiments, the machine learning models described herein may operate in the same manner as described herein with respect to an utterance as an input feature to the models, but would instead be trained with identification of a gesture in place of utterance information in the training and production input features for the models.

Overview of Speech-Based Control System and Operating Environment

FIG. 1 illustrates an embodiment of a networked computing environment 100 for implementing one or more embodiments of a speech-based control system 130. The environment 100 includes a network 108, a player computing system 102, one or more optional other player computing systems 103, and an interactive computing system 120. To simplify discussion and not to limit the present disclosure, FIG. 1 illustrates only one interactive computing system 120, though multiple systems may be used.

The interactive computing system 120 can include application host systems 122, one or more data stores 124, and a speech-based control system 130. The speech-based control system 130 can communicate with data store 124 and/or with the application host systems 122 to acquire data associated with a game application and to control an in-game NPC based on a player's voice command or other utterance, as will be discussed herein. The speech-based control system 130 can additionally or alternatively communicate with player computing system 102 and/or one or more other player computing systems 103 through the network 108. Although only one network 108 is illustrated, multiple distinct and/or distributed networks may exist. The various systems and other components illustrated in FIG. 1, including interactions or communications between them, will now be described in more detail below.

A. Interactive Computing System

In the illustrated embodiment, the interactive computing system 120 includes application host systems 122, a data store 124, and a speech-based control system 130. These systems may communicate with each other. For example, the speech-based control system 130 can obtain data associated with a game application (such as game state information) from one or more of the application host systems 122 and can provide character control data to one or more application host systems 122. The application host systems 122 can communicate with the data store 124 to execute and/or host a game application. In certain embodiments, the interactive computing system 120 may be considered a game server that provides network-based support for single player or multiplayer video games played by players utilizing various player computing systems, such as player computing systems 102 and 103.

1. Application Host Systems

The application host systems 122 can be configured to execute a portion of the game application 104 operating on the player computing system 102 and/or a host application (not illustrated) on the interactive computing system 120. In certain embodiments, the application host systems 122 may execute another application instead of or in addition to executing a portion of the game application 104 and/or a host application, which may complement and/or interact with the game application 104 during execution of a gameplay session of the game application 104. An instance of a game that is executed based at least in part on an application host system interacting with one or more game applications on player computing systems may be referred to herein as a hosted instance of a game. Further details regarding application host systems are described below.

The interactive computing system 120 may enable multiple players or computing systems to access a portion of the game application 104 and/or a host application. In some embodiments, the portion of the game application 104 executed by application host systems 122 of the interactive computing system 120 may create a persistent virtual world. This persistent virtual world or virtual environment may enable one or more players to interact with the virtual world and with each other in a synchronous and/or asynchronous manner. In some cases, multiple instances of the persistent virtual world may be created or hosted by the interactive computing system 120. A set of players may be assigned to or may access one instance of the persistent virtual world while another set of players may be assigned to or may access another instance of the persistent virtual world. In some games, a set of players may cooperatively interact with each other within the same instance of a virtual world, such as being placed on the same team within an instance of a sports video game or being grouped together in a match, mission, quest, campaign or other cooperative mode in any of various types or genres of games. In either a single player mode or multiplayer mode, a game may include one or NPCs that cooperate with a player's player-controlled character to pursue in-game objectives, such as computer-controlled teammates of the player.

In some embodiments, the application host systems 122 may execute a hosting system for executing various aspects of a game environment. For example, in one embodiment, the game application 104 may be a competitive game, such as a first person shooter or sports game, and the host application system 122 can provide a dedicated hosting service for hosting multiplayer game instances or facilitate the creation of game instances hosted by player computing devices. The in-game interactions between players, as well as between a player and NPC teammates, may vary widely depending on the type of game being played. For example, in one game a group of characters (whether player controlled or NPCs) may cooperatively work together to build a virtual city, while in another game, characters may cooperate in combat simulation. Aspects of the present disclosure may provide benefits in nearly any genre of video game in which at least one NPC cooperates or assists a player-controlled character, such as shooter games (such as first person or third person shooters), survival games, adventure games, sports games, platform games, role playing games, simulation games, strategy games, racing games, etc.

2. Speech-Based Control System

As will be described in further detail herein, the speech-based control system 130 can communicate with other systems to learn in-game actions to perform in response to player-created voice commands or utterances, and to cause an NPC to perform particular actions in response to associated voice commands uttered by a player during gameplay. The speech-based control system 130 can include one or more systems, subsystems or components for implementing various functionality described herein. For example, the speech-based control system 130 can include a training environment component 132, utterance parser 134, game state capture component 136, utterance classifier(s) 138, inverse reinforcement learning system 140, and NPC control component 142. These example systems or components are not intended to be limiting, and the speech-based control system 130 may include fewer or more systems or components than illustrated or described.

The training environment component 132 may generate instances of a training environment within a video game, which may be presented to a player of the player computing system 102 for interaction during a training phase of the speech-based control functionality for a given game. As will be further described below, the training environment may present simplified game states designed to collect training data based on the player's utterances during training and the associated player control inputs. The utterance parser 134 may generally parse utterances that include multiple words or phrases based on rules associated with a given model and/or prior training data. For example, an utterance such as "Smith run to the left" may be parsed to determine that the utterance includes identification of a character name (Smith), an action command or intent (run) to apply to that character, and parameter information associated the command or intent (to the left). The game state capture component 136 may capture and store a representation of the current game state at any point in time, which may occur in a number of ways at any of a number of different levels of detail, as will be further described herein.

The utterance classifier(s) 138 may be implemented by the speech-based control system 130 as one or more first tier models, as will be further described herein, such as to determine an emulated control or in-game action to initiate based on a given speech utterance. The inverse reinforcement learning system 140, may be implemented by the speech-based control system 130 as one or more second tier models, as will be further described herein, such as to determine an inferred in-game goal associated with a given speech utterance and/or to determine a series of in-game actions to initiate to reach an inferred goal. The NPC control component 142 may provide NPC control instructions to an application host system 122 and/or game application 104 based on output of the utterance classifier 138 and/or inverse reinforcement learning system 140. For example, the NPC control component may determine that a certain NPC should perform an action, such as jumping or kneeling, based on a utterance just spoken by a player, and cause the action to be performed by the NPC in the game.

The speech-based control system 130 and its various systems or components may be distributed across multiple computing systems. The various systems of the speech-based control system 130 can communicate with each other to obtain, analyze and generate data. While various systems are illustrated as part of the interactive computing system 120 and/or speech-based control system 130, it will be appreciated that each system's functionality could be implemented by a different or multiple computing systems or devices. Furthermore, a single system could implement functionality described herein as being provided or implemented by multiple systems in communication with each other. Similarly, functionality described as being provided by the speech-based control system 130 of the interactive computing system 120 could instead be implemented at a player computing system 102, in other embodiments.

The speech-based control system 130 can further include a model data store 145. The data store 145 can be configured to store first and second tier models related to speech utterances, as will be further described below. In some embodiments, the data store 145 may additionally store training data for the models, such as historical game interaction data, voice utterances and associated game state data. The data store 145 may be distributed across multiple computing devices (see for example computing device 10 in FIG. 5). In some embodiments, the data store 145 may be a network-based storage system where data may be stored in different locations.

3. Data Store of Interactive Computing System

The interactive computing system 120 can include a data store 124. The data store 124 can be configured to store data acquired by other systems, such as, for example, telemetry data, video data, game state information, user data, or the like. In some embodiments, the data store 124 may store user account data associated with a video game publisher, a game platform provider or other service that enables a user to maintain preferences, virtual characters, avatars, achievements, and/or other data across a plurality of different video games. For example, account identifier data stored in data store 124 may be used by the speech-based control system 130 to associate stored voice-related models and custom utterances with particular players' accounts. The data store 124 may be distributed across multiple computing devices (see for example computing device 10 in FIG. 5). In some embodiments, the data store 124 may be network-based storage system where data may be stored in different locations.

B. Player Computing System(s)

Each of the player computing system 102 and optional other player computing systems 103 can be controlled by a different user, such as different players of a video game. The player computing system 102 may include hardware and software components for establishing communications over a communication network 108. For example, the player computing system 102 may be equipped with networking equipment and network software applications (for example, a web browser) that facilitates communications via one or more networks (for example, the Internet or an intranet). The player computing system 102 may have varied local computing resources such as central processing units and architectures, memory, mass storage, graphics processing units, communication network availability and bandwidth, and so forth. Further, the player computing system may include or be in local communication with a microphone that captures voice utterances spoken by the player who utilizes player computing system 102.

The player computing system 102 may include any type of computing system. For example, the player computing system 102 may include any type of computing device(s), such as desktops, laptops, game application platforms, game console systems, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few.

In some embodiments, the player computing system 102 may include one or more of the components or embodiments described below. In some embodiments, individual other player computing systems 103 may include similar components as the player computing system 102, though may also have differences (e.g., one player may play a given game from a mobile device while another player may play the same game on a desktop computer or game console system). In some embodiments, voice commands as discussed herein may be received and processed with respect to a single player game, such that no other computing systems 103 may be present in certain embodiments.

1. Game Application(s) and Host Application System

The player computing system 102 and each of the other player computing systems 103 may be capable of executing one or more game applications 104, which may be stored and/or executed locally and/or in a distributed environment. In a locally executed game application 104, generally, the game does not rely or utilize an external computing system (for example, the interactive computing system 120) to execute the game application. In some instances, a locally executable game can communicate with an external server to retrieve information associated with the game, such as game patches, game authentication, clouds saves, user account data, previously trained model data, or other features. In distributed game applications, the player computing system 102 may execute a portion of a game and the interactive computing system 120, or an application host system 122 of the interactive computing system 120 may execute another portion of the game. For instance, the game may be a massively multiplayer online role-playing game (MMORPG) that includes a client portion executed by each of the player computing systems 102 and 103, and a server portion executed by one or more application host systems 122. For the present discussion, the type of game application 104 can be a locally executable game, a distributed application, or an application that includes a portion that executes on the player computing system 102 and a portion that executes on at least one of the application host systems 122.

2. Player Data Store

The player computing system 102 can include a data store 126. The data store 126 can be configured to store data associated with one or more game applications 104, local account data associated with an account maintained for the player by the interactive computing system 120, gameplay history data, trained models discussed herein (either trained by the player computing system 102 or the speech-based control system 130, depending on the embodiment) and/or other game-related or account-related data. The data store 126 may be distributed across multiple computing devices (see for example computing device 10 in FIG. 5).

C. Speech Processing System

The game application 104 of the player computing system 110 may include an audio capture component (not illustrated) that is configured to receive audio data of one or more utterances made by a player interacting with the player computing system 102 during gameplay, such as via one or more microphones. In some embodiments, the game application on the player computing system 102 may convert the one or more utterances into one or more words, commands, or speech using known speech-to-text or speech recognition techniques. In other instances, the speech processing system 114 may receive audio data from the player computing system 102 to provide corresponding text output or translation for recognized words in the utterances (such as words appearing in a dictionary) and/or may generate intermediate results of phonetic spelling of other textual representation of vocal utterances that do not appear in a dictionary (such as in embodiments in which a player may make up fictitious words as custom voice commands). For example, the game application may interact with a cloud or network-based system, such as the speech processing system 114, to facilitate recognizing utterances spoken by player and/or for other speech processing functionality. For example, the game application may interact with a speech processing system 114 that converts a captured utterance into one or more words. The game application 104 may receive, via a microphone, utterances or other audio from a player or other user of the player computing system 102. This captured audio may be transmitted to the speech processing system 114.

The speech processing system 114 may be or may include an audio or voice analysis system or component capable of parsing the audio captured by the audio capture system 102 into words or other recognized sounds. The parsed words may be provided back to the player computing system 102 and/or to the interactive computing system 120 for further processing and/or subsequent action based on the identified utterances. For example, the speech processing system may provide a voice-to-text translation of the received audio content, which may then be provided to the speech-based control system 130 for use in either training one or more machine learning models described herein or initiating an in-game action associated with the utterance(s) spoken by the player.

D. Other Considerations

Although the various systems are described separately above, it should be noted that one or more of these systems may be combined together. For example, one or more of the systems may be executed by the same computing device (see for example, computing device 10 in FIG. 5) or by a different computing system than illustrated in FIG. 1. In some embodiments, the speech-based control system 130 may be executed on the same computing device as the player computing system 102. In such embodiments, for instance, the model training and speech-based NPC control features described herein may be performed entirely by the player computing system 102, such as in a single player mode and/or offline mode, without necessarily communicating with an interactive computer system 120 or other network-accessible system. On the other hand, one or more systems may be executed by multiple computing devices. For example, a portion or subsystem of the speech-based control system 130 may be implemented by the player computing system 102 while another portion or subsystem may be implemented by a server.

Illustrative Methods for Model Training

Figure 2:
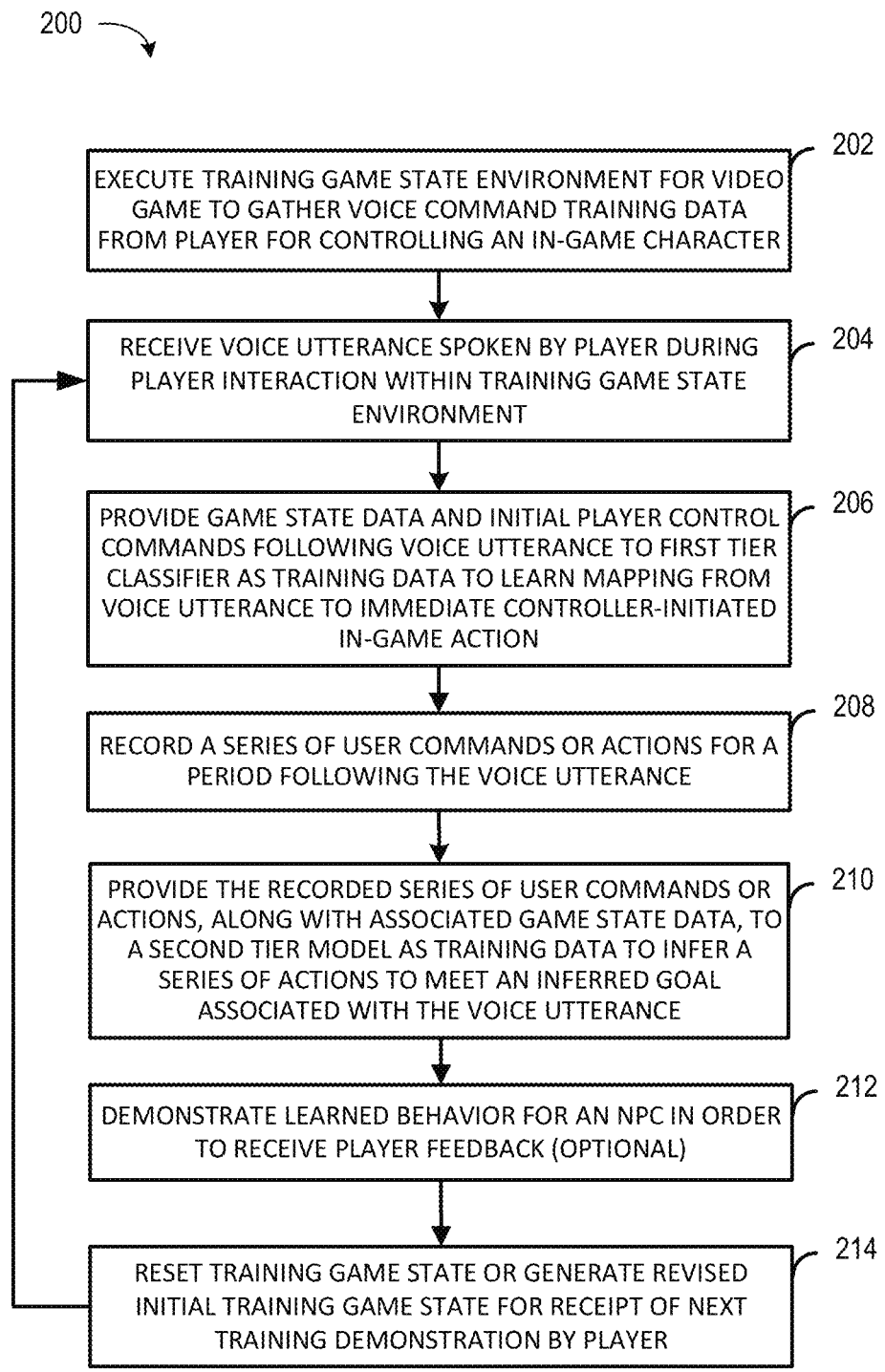
FIG. 2 is a flow diagram of an illustrative method for training machine learning models to control a non-player character in a game based on custom player-defined speech utterances, according to some embodiments.

FIG. 2 is a flow diagram of an illustrative method 200 for training machine learning models to control a non-player character in a game based on custom player-defined speech utterances, according to some embodiments. In some embodiments, the method 200, in whole or in part, can be implemented by a game application 104, a speech-based control system 130, a player computing system 102, an interactive computing system 120, or other application component or module. Although any number of systems, in whole or in part, can implement the method 200, to simplify discussion, the method 200 will be described with respect to particular systems or components of the interactive computing system 120.

The method 200 begins at block 202, where the training environment component 132 (in cooperation with the application host system 122 and/or game application 104) may generate and execute a training game state environment for a video game in order to gather voice command training data from a player for controlling an in-game NPC or other character. As mentioned above, the training environment component 132 may generate instances of a training environment within a video game, which may be presented to a player of the player computing system 102 for interaction during a training phase of the speech-based control functionality for a given game. The training environment may present simplified game states designed to collect training data based on the player's utterances during training and the associated player control inputs. For example, in a basketball video game in which the typical in-game environment includes 10 in-game characters (five characters on each of two teams), the training environment may present a simplified or sandbox state in which the only characters present are a player-controlled character and a single AI-controlled or NPC teammate. Alternatively, in another instance, the training environment may include characters that behave differently than in actual gameplay, such as by characters of the opposing team being present, but not behaving according to their typical programmed in-game behavior (e.g., not attempting to steal the ball or block shots, etc.).

In some embodiments, the player may control a character in the training environment that is different or serves a different in-game role than would typically be controlled by the player in the game. For example, continuing the basketball example, the standard gameplay for a given basketball game may typically cause control by the player to switch to the member of the player's team that has the ball (e.g., the player may initially control a point guard, but once the player chooses to pass the ball to a forward, the player automatically takes over control of the forward rather than the point guard, with the point guard switching to computer control). In such an example, the training environment may enable a player to select to choose to control a character who does not have the ball in order to provide examples to the speech-based control system of the behavior that the player desires an off-ball NPC to perform in response to a given speech utterance by the player. While blocks 202 and 204 are illustrated as being performed within a training game state, in other embodiments, the model training may occur during actual gameplay rather than (or in addition to) within a training environment.

At block 204, the speech-based control system 130 may receive indication of a voice utterance spoken by the player during the player's interaction within the training game state environment. The utterance may initially be captured by a microphone of the player computing system 102, and then converted to corresponding text by the player computing system, the speech processing system 114, or the speech-based control system, as discussed above. The utterance may be a word or phrase that the player spoke in order to indicate that the player is about to demonstrate the in-game character behavior that the player would like to associate with the spoken word or phrase.

At block 206, the speech-based control system 130 may then provide the current game state data and initial player control commands following the voice utterance to a first tier classifier as training data to learn a mapping from voice utterance to an immediate controller-initiated in-game action. This may occur during the training session in real time or near real time, or may occur as a batch training process once a number of training sessions or instances have been completed. For example, the captured utterance, game state information and player control data may be first stored in a data store prior to being providing as training data to any models.

The first classifier may employ any of a number of different machine learning techniques in order to classify the game state, utterance and/or other set of input features provided to the classifier. For example, the classifier may employ one or more decision trees, Markov models, convolutional neural networks, deep neural networks, various apprenticeship learning algorithms, inverse reinforcement learning algorithms, and/or other known classification methods. The initial player control command(s) provided to the first tier classifier may include the first input control signal received from a control device of the player following the player's utterance. For example, if the player spoke the command "jump" and then the next button that he pressed on his game controller device was the "B" button, the input training features provided to the first tier model in the given instance may include identification of the "jump" utterance, the "B" button, and a representation of the current game state (such as the player's character's position on the basketball court, positions of other characters, and/or other relevant game state data in a given instance).

Over many training trials (such as many instances of the player speaking the "jump" utterance and then pressing one or more button combinations to control an in-game character in various in-game situations), the first tier model learns to map each of a number of different utterances to an in-game action or emulated control desired by the player for the given utterance. Because the training input features include game state information that may be different across different training trials, the first tier model may learn that a given utterance (such as "move forward") should result in a different NPC behavior or action depending on the game state (such as moving left toward the basket when on one side of the court, but moving right toward the basket when on the other side of the court).

The player control command(s) entered by the player following the player's utterance can include, for example, directional inputs along a first axis (such as up/down) or provided to a first joystick (such as a left joystick), second directional inputs provided along a second axis (such as left/right) or provided to a second joystick (such as a right joystick), whether buttons (such as A, B, X, Y, Z, left bumper, right bumper, start, select, turbo, mouse clicks, finger taps, and the like) are pressed to cause a unit or character in the video game to perform an assigned action, and/or other input data. The player control commands can be provided through any of a variety of input devices and input formats, such as through a controller, through a mouse and keyboard, through a touchscreen, and the like. The control commands may be stored or provided to models for training as enumerated data identifying the buttons pressed, for example. In other embodiments, the actual button presses, mouse clicks or other information may be processed by the game application 104 locally at the player computing system 102 and translated into an in-game action (e.g., a character jumping, taking a step in a certain direction, shooting gun, etc.), where this in-game action or other result of the player input is provided as the player control command to the application host system and/or the speech-based control system for use in model training.

In some embodiments, the control command may be interpreted by the game application or application host system as an instruction for a specific in-game character under control of the player in the training environment to perform one or more in-game actions (such as an action previously assigned to a given button pressed by the player). For example, in a basketball game, pressing a certain button may cause a virtual basketball player character to shoot a basket or jump to block an opponent's shot depending on the game state (e.g., depending on whether the virtual basketball player character has the ball or is on defense). As another example, the virtual entity under control of a character could be a grouping of a number of in-game virtual units, such as an army of soldiers in a war simulation game, which are launched into attack in a certain formation and with a certain target based on a set of commands entered by the player.

In some embodiments, the first tier model may only be provided with the initial control command data immediately following the utterance (such as the first pressed button or first combination of buttons pressed simultaneously), while a second tier model may be provided with a subsequent series of control commands to accomplish more involved in-game goals than can be accomplished with a single in-game action or button combination. Accordingly, at block 208, the speech-based control system 130 and/or player computing system may record a series of user commands or actions for a period of time following the voice utterance.

The length of playtime for which input controls are provided as a set of training input features in a given instance of an utterance may be determined in a number of ways, depending on the embodiment. As one example, the player may be able to speak a "stop" or "end" command to signal to the speech-based control system 130 that he has completed the series of actions that he intends to associate with the spoken utterance. As another example, the series of action may continue until the user pauses or stops pressing any input controls (e.g., control input recording for the given trial may stop when no control input is received for a predetermined amount of time, such as two seconds). In some embodiments, such as those in which training may occur during actual gameplay rather than in a training environment, the stopping point for input controls to consider as associated with a given instance of an utterance may be dynamically determined by the speech-based control system by identifying commonalities between control commands entered by the player following each of a number of instances in which the player spoke the same utterance.

At block 210, the speech-based control system may provide the recorded series of user commands or actions, along with associated game state data, to a second tier model as training data to infer a series of actions to meet an inferred goal associated with the voice utterance. In some embodiments, the second tier model may be trained using one or more inverse reinforcement learning algorithms, which may include employing deep learning such as a deep convolutional neural network. However, it will be appreciated that other machine learning approaches may be employed in other embodiments. The second tier model may be trained to infer a goal that the player appears to be attempting to accomplish after speaking a given utterance, as well as learning to accomplish the inferred goal in a variety of game states or situations.

For example, if the player wishes to establish a spoken command such as "go around the building and shoot the enemy," the series of actions and associated input controls needed to accomplish that goal may vary significantly depending on the character's in-game position, object positions within the virtual environment, enemy locations, etc. For example, the character may need to walk different distances, make additional turns to avoid environmental objects, locate an enemy at different positions, and/or other variations between training trials. Series of actions to be performed for other goals may vary less between game states, such as a phrase "jump and shoot" that may involve a similar series of two or three actions in any of many different game states. Thus, depending on a complexity level of the goal and variety of actions that may be required to accomplish it depending on the game state, the player may be prompted to perform a number of examples of the desired action in a variety of game states generated by the training environment component 132.

As mentioned above, the actions performed by the player via input control commands following an utterance during training may generally be intended by the player to teach the speech-based control system how an NPC should later behave when the player speaks the given utterance in actual gameplay. Thus, continuing the earlier example in which a player typically controls the character who has the ball when on offense in a basketball game, the player may control a character who does not have the ball within the training environment. If the player wants to teach the system 130 to learn how to have an NPC teammate of the player's in-game character initiate a series of actions for an alley-oop (an offensive basketball play in which one character throws the ball near the basket to a teammate who jumps, catches the ball in mid-air and dunks it), the player may speak a command such as "alley-oop" (or any other phrase desired by the player for this goal). The player may then use a directional pad and buttons on his game controller (or other control input options in a given game) to cause the away-from-the-ball character that the player is controlling in the training environment to run towards the basket and jump toward the rim. These may be the desired actions that the player wants an NPC to perform in actual gameplay when the player later speaks the "alley-oop" command or utterance, so that the player can cause his player-controlled character to pass the ball to the NPC teammate at the appropriate time in the run and jump sequence to perform an alley-oop.

At block 212, the interactive computing system 120 and/or game application 104 may optionally demonstrate the learned behavior for an NPC in order to receive player feedback. This demonstration may occur within the training environment during a training process, or similar feedback may be provided by the player during actual gameplay subsequent to completion of initial training. For example, the player may speak any of the various utterances that he spoke during the training phase, and the NPC control component 142, in combination with the trained models, may cause an NPC in the game to behave according to the training for the given utterance in a manner similar to that of FIG. 3 discussed below. The player may provide feedback to indicate whether the NPC's actions or behavior in the given demonstration accurately reflect the behavior, goals or actions that the player intended to associate with the given utterance. The feedback may be provided by voice (such as the player stating "good" or "bad"), by gesture (such as nodding or shaking the player's head), by a designated input command on a controller or other input mechanism, or by selection of a menu item or user interface element presented within the game. The feedback may be used by the speech-based control system 130 in further model training, to determine whether model training for a given utterance is complete, and/or to prompt the player to re-demonstrate desired character behavior for a given utterance in a given game state.

At block 214, the training environment component 132 may optionally reset the training game state or generate a revised initial training game state for receipt of a next training demonstration by the player, assuming that training is not complete or that the player does not choose to exit out of the training environment. In some embodiments, the training environment component 132 may cycle through various training game states (e.g., different teammate positions, different enemy positions, different maps or in-game objects, etc.) in order to gather a variety of training data across a representative sampling of different possible game states that may be encountered in the game. In other embodiments, the player may select the training environment (such as a particular character formation, map, level, etc.), such as if the player intends to speak the given utterance only in particular situations in actual gameplay that he has in mind during training. In other embodiments, the training environment may not reset after each utterance, but may be a continuously presented environment in which the player interacts while speaking various utterances. Once the environment is ready for the next training trial (or immediately if no reset is employed in the given instance), the method 200 returns to block 204 to await the next voice utterance for further model training.

Illustrative Methods for Responding to an in-Game Utterance

Figure 3:
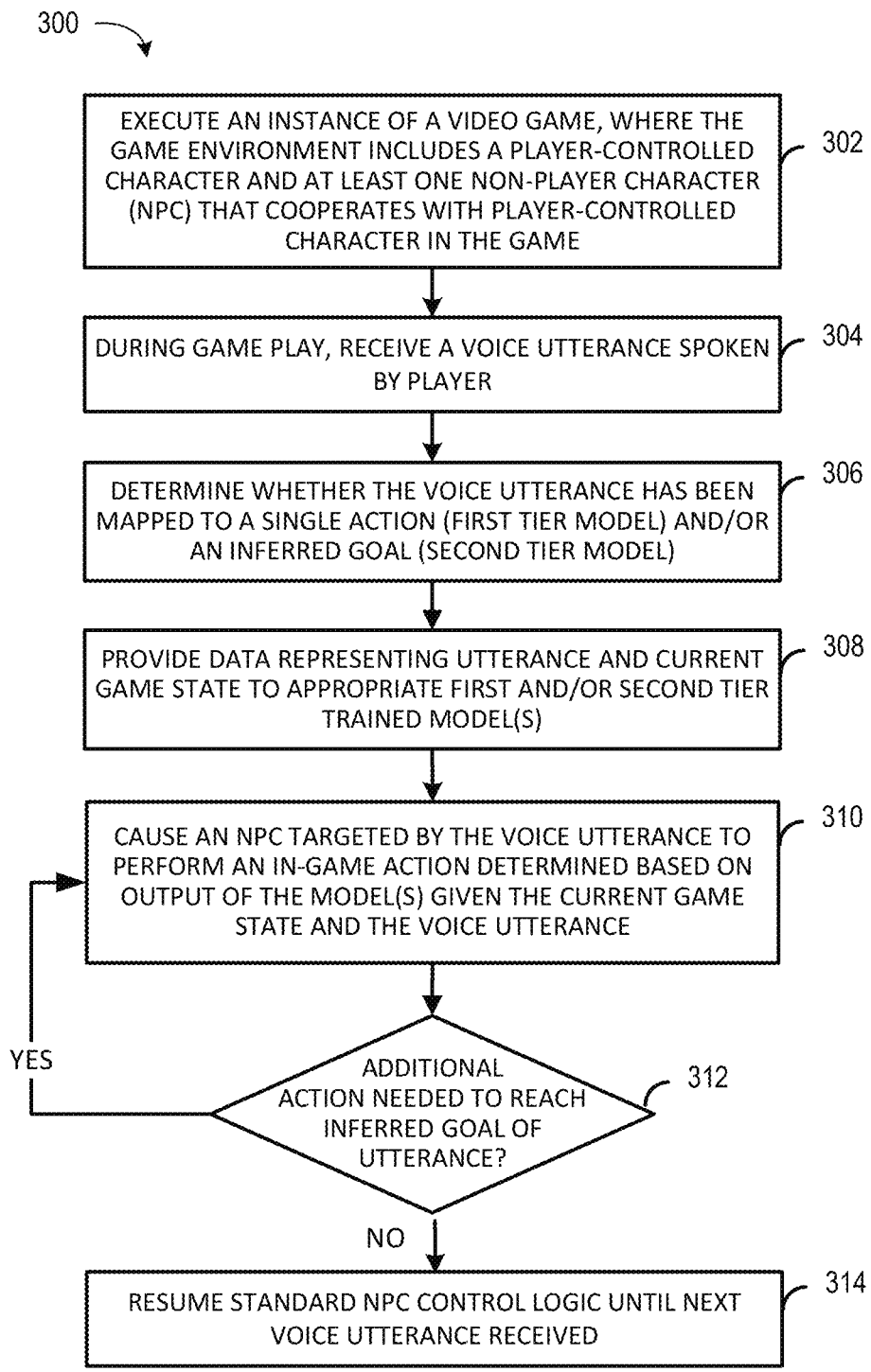
FIG. 3 is a flow diagram of an illustrative method for controlling one or more non-player characters in a game based on custom player-defined speech utterances, according to some embodiments.

FIG. 3 is a flow diagram of an illustrative method 300 for controlling one or more non-player characters in a game based on custom player-defined speech utterances, according to some embodiments. Illustrative method 300 may be implemented after an initial training process (described above with respect to FIG. 2) is complete. In some embodiments, the method 300, in whole or in part, can be implemented by a game application 104, a speech-based control system 130, a player computing system 102, an interactive computing system 120, or other application component or module. Although any number of systems, in whole or in part, can implement the method 300, to simplify discussion, the method 300 will be described with respect to particular systems or components of the interactive computing system 120.

At block 302, the game application 104 and/or application host system 122 may execute an instance of a video game, where the game environment includes a player-controlled character and at least one non-player character (NPC) that cooperates with player-controlled character in the game. For example, the NPC may be a teammate of the player-controlled character, a sidekick or companion of the player-controlled character (such as a dog character that accompanies the player-controlled human character in the game), and/or other character type that cooperates with the player-controlled character in at least some circumstances and is primarily controlled by AI rather than by the player. Depending on whether the game is a single player or multiplayer game, the game environment may additionally include characters that are under control of one or more other players, who may be either competing against or cooperating with the first player within the game instance.

During execution of the game instance, at block 304, the player computing system 102 may receive a voice utterance spoken by the player, which may be captured by a microphone of the player computer system 102. As discussed above, the audio recording of the voice utterance may then be initially processed and translated to corresponding text by the player computing system 102, the speech processing system 114, or the interactive computing system, depending on the embodiment.

At block 306, the speech-based control system 130 may determine whether the voice utterance has been mapped to a single action (which may be classified by a first tier model discussed herein) and/or an inferred goal (which may be classified by a second tier model discussed herein). For example, in some embodiments, the speech-based control system 130 may store a first list of utterances that can be classified to immediate atomic actions by the first tier classifier, and a second list of utterances that should be processed by the second tier model to determine a series of actions to accomplish an inferred goal associated with the utterance. In other embodiments, both models may be employed in each instance of an utterance, as will be further described below.

At block 308, the speech-based control system 130 may provide data identifying or representing the utterance and the current game state to the first and/or second tier trained model(s). In cases in which the input features are provided to both models, as will be described below with respect to FIG. 4, the models may operate in sequence or parallel, and may include confidence levels in their output in order for the speech-based control system to select an appropriate in-game action. For example, the first tier classifier may have a high confidence in its selected action or emulated control for a given utterance when the training data for that utterance suggested that the player intended a simply mapping from the utterance to a certain atomic in-game action (like a character jumping or ducking). In contrast, the first tier classifier may have a low confidence level (if any) in cases where the player control commands for the utterance varied greatly between different game states in training, in which case the second tier classifier would be employed to determine a responsive in-game action for the utterance.

At block 310, the NPC control component 142 may cause an NPC targeted by the voice utterance to perform an in-game action determined based on output of the model(s) given the current game state and the voice utterance. The NPC targeted by the voice utterance may be determined based on a name given to the NPC and spoken in the utterance (e.g., "Rover, bring my supplies" or "Red troop, go left"), an NPC nearest to the player-controlled character, an NPC having a given role associated with the utterance, a pointing gesture from the player, eye gaze detection to determine where the player is looking on a display screen, and/or other manner depending on the embodiment.

In some instances in which an action output of the first tier classifier is selected by the system 120 to be performed, the action may be directly mapped from the utterance, such that the NPC completes the entire action(s) responsive to the utterance (as output by the first tier classifier) immediately, such as a single jump action. In other instances, including instances in which the second tier model is employed to accomplish a more involved goal, block 310 may involve causing the NPC to perform an initial atomic action (e.g., begin running in a certain direction), and then may begin looping through execution of the second tier model to determine additional actions that the targeted NPC should perform based on a continuously updated set of input features representing the revised game state as the NPC and other characters move (or perform other actions) in order to accomplish the inferred goal of the utterance.

At block 310, the speech-based control system 130 may determine whether any additional action should be performed by the targeted NPC in order to accomplish an inferred goal associated with the utterance (e.g., whether to continue a series of actions by the targeted NPC based on the voice utterance). If not, and any inferred goal associated with the utterance is complete (or the utterance was mapped to a single atomic action), the method proceeds to block 314 for the game application and/or application host system 122 to resume standard NPC control logic for the given targeted NPC until any new voice utterance is received. If instead the model(s) determine that any additional action should be performed by the NPC based on the prior utterance (such as to accomplish an inferred goal), the method may return to block 310 where the NPC control component 142 causes an additional action to be performed by the NPC targeted by the previous utterance. As discussed above, this may include providing new input to the second tier model reflecting an updated game state since the targeted NPC performed the initial or previous action based on the utterance.

Example Training and Use of Models for Utterance Classification

Figure 4:
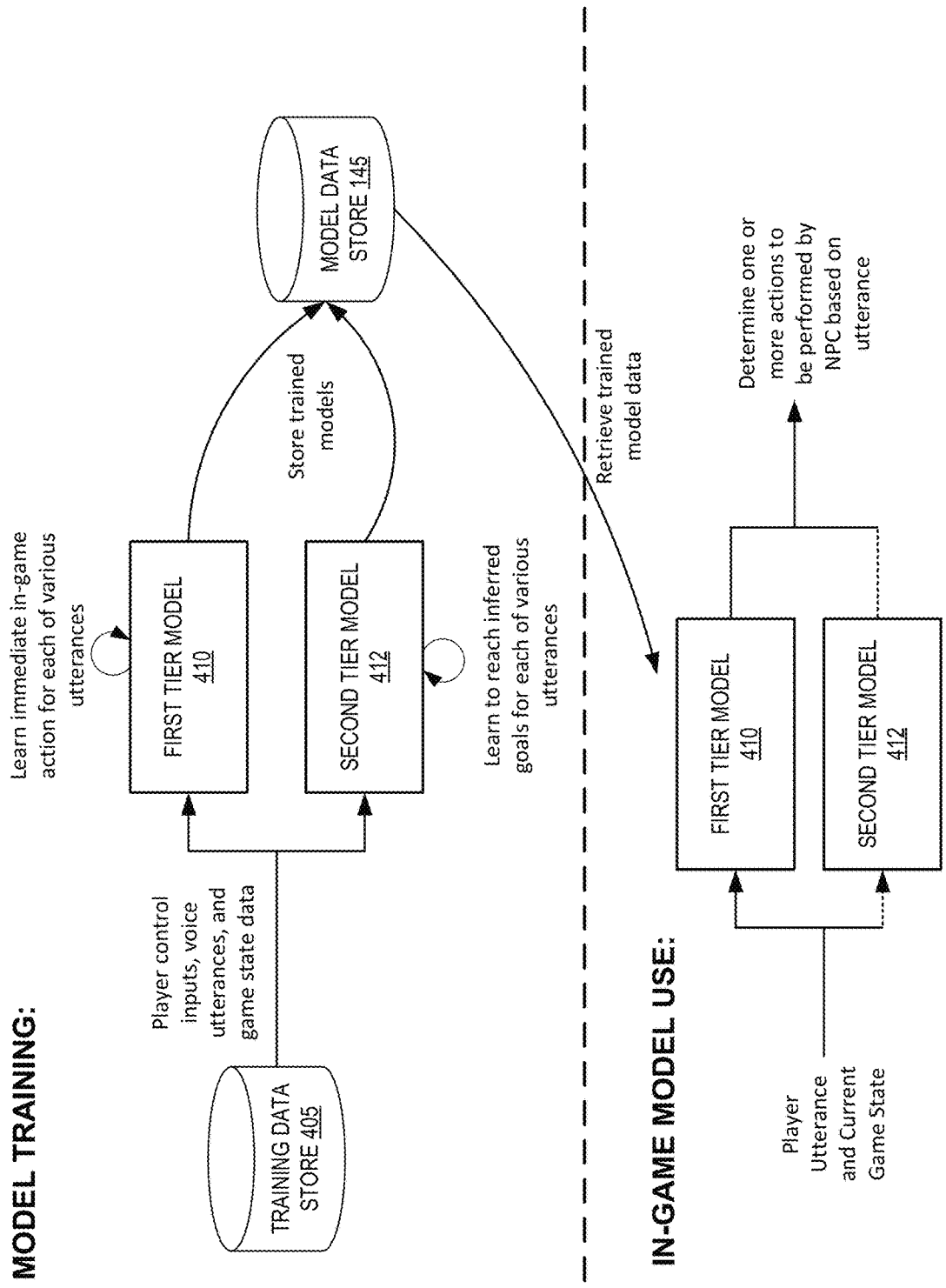
FIG. 4 provides an illustrative data flow of training and utilizing first tier and second tier machine learning models to determine in-game character actions to be performed in response to player utterances, according to some embodiments.

FIG. 4 provides an illustrative data flow of training and utilizing first tier and second tier machine learning models to determine in-game character actions to be performed in response to player utterances, according to some embodiments. While FIG. 4 provides examples of certain models that may be employed in the present disclosure, it will be appreciated that various advantages of the features described herein may not be particular to any specific model type. For example, the models may include one or more decision trees, Markov models, convolutional neural networks, deep neural networks, various apprenticeship learning algorithms, inverse reinforcement learning algorithms, adversarial networks, and/or other methods of modeling behavior or controlling an AI or NPC entity in a video game based on speech utterances or gestures. Thus, the illustrative examples described below with respect to FIG. 4 should not be read as limiting the types of models that may be employed by the speech based control system 130 or model data store 145 in all embodiments.

As illustrated in FIG. 4, player control inputs, voice utterances and game state data may be provided as training features to the first tier and second tier models 410 and 412. As discussed above, this training data from training data store 405 may be historical data recorded during gameplay, historical data recorded within a training environment presented to a player, and/or may include live gameplay data received in real time or near real time during player interaction with the game. In some embodiments, the training data may include, for example, game state data, player input, in-game actions taken, virtual environment data, and/or any other game data that may influence the player's choice of commands or actions in a given in-game situation. This game state and/or control information may be modified prior to storage in the training data store 405 and/or prior to being provided as input features to the models. For example, such processing may include applying quantization, compression, rounding or other manipulations to raw game session data received from a game application.

The data in training data store 405 may include detailed gameplay data for a player across potentially a long time period (e.g., weeks or months) and potentially multiple underlying video games (e.g., both a first game and its sequel, as well as unrelated games). The level of detail stored may depend on a number of factors, including the complexity of the particular game, a subscription or plan level associated with a player's account with an operator of the interactive computing system 120, and/or other factors. For example, the historical game session data stored for one session may be sufficiently detailed for the player to play back a full replay of every action taken by the player. In a less detailed instance, the stored data may have been coarsened or quantized as discussed above prior to storage.

As illustrated, the training data from data store 405 may be used by the speech-based control system 130 to train a first tier model and a second tier model. As previously described above, the training may include the first tier model or classifier 410 learning an immediate in-game action (such as an action that can be accomplished with a single player input or control) to apply to a character for each of one or more utterances identified in the training data. As further described above, the training may further include training a second tier model 412 to learn to reach an inferred goal (including in-game actions to accomplish the goal) for each of one or more utterances identified in the training data, such as using inverse reinforcement learning techniques. The trained models 410 and 412 may be stored in model data store 145. The speech-based control system 130 may retrain or revise the models 410 and 412 as additional training data becomes available and/or based on player feedback.

As shown in the in-game model use section of FIG. 4, use of the trained models in model data store 145 may involve the model data being retrieved from the data store and the models being provided with input features that include current game state information and identification of an utterance just spoken by the player. In some embodiments, the input features may be provided for processing by both models in parallel. The models 410 and 412 may each output confidence levels in their classifications, in some embodiments, and an in-game action may be selected based on the confidence levels (such as a voting procedure). In other embodiments, the models may be implemented in sequence. In some such embodiments, the second tier model 412 may not be implemented in a given instance if the first tier model has sufficient confidence in a classification from the utterance and game state to a particular atomic in-game action or emulated control. As discussed in more detail above, the speech-based control system 130 may use the output of the first and/or second tier model in a given instance to determine one or more actions to be performed by an NPC within the game instance based on the utterance provided to the model(s). In some embodiments, this may include looping through execution of the second tier model with a series of updated game states and the same utterance indication in order to accomplish a series of actions to reach an inferred goal based on a changing game state. As discussed above, the speech-based control system 130 may cause a particular NPC or other in-game character to perform the determined action or series of actions within the game in real time following the player utterance.

Overview of Computing Device

Figure 5:
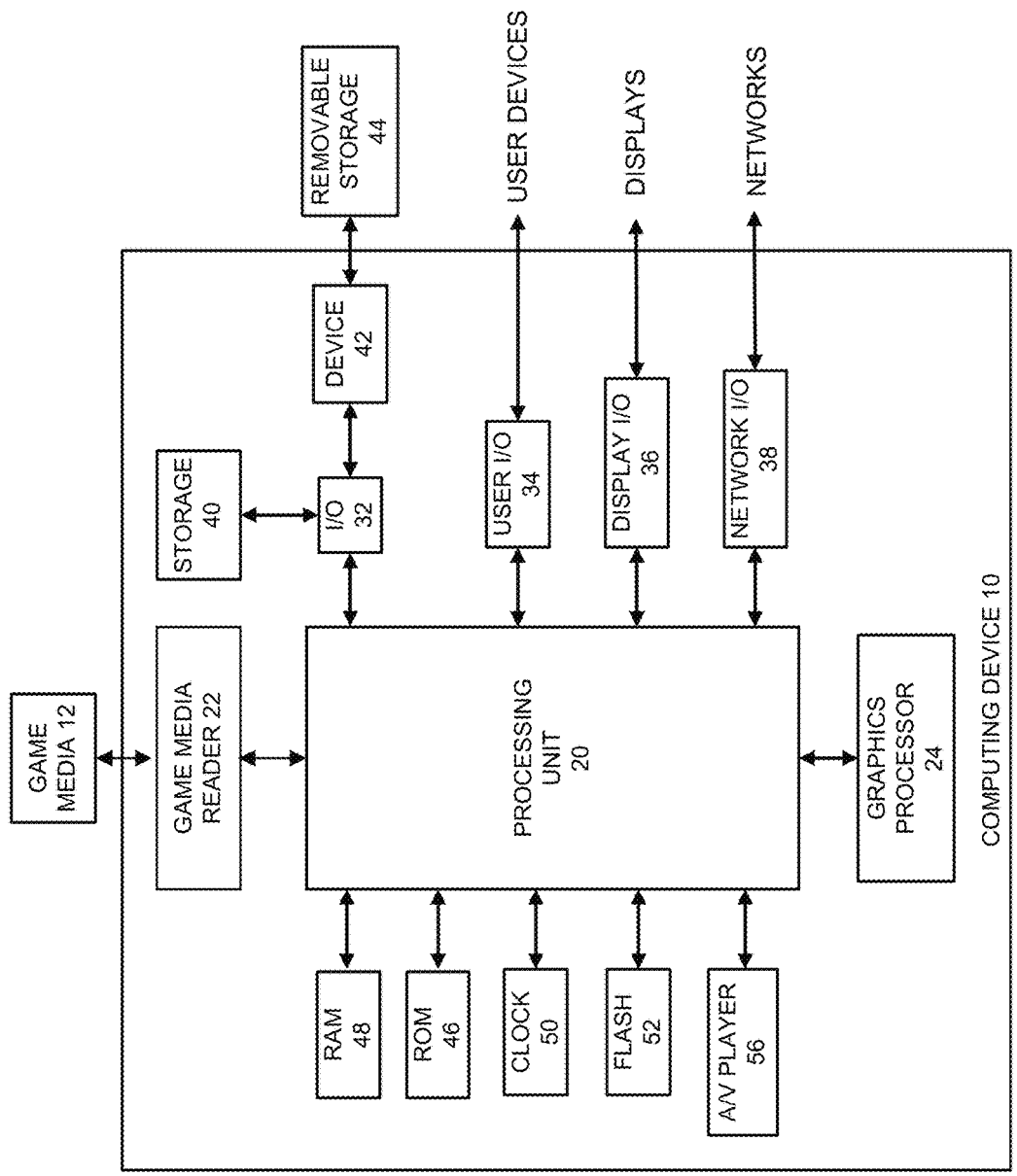
FIG. 5 illustrates an embodiment of a computing device that may implement aspects of the present disclosure.

FIG. 5 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device 10 may also be distributed across multiple geographical locations. For example, the computing device 10 may be a cluster of cloud-based servers. In some embodiments, the player computing system 102 may include one or more of the components illustrated in FIG. 5, while in other embodiments, the interactive computing system 120 may include one or more of the components illustrated in FIG. 5.

As shown, the computing device 10 includes a processing unit 20 that interacts with other components of the computing device 10 and also external components to computing device 10. A game media reader 22 is included that communicates with game media 12. The game media reader 22 may be an optical disc reader capable of reading optical discs, such as CD-ROMs or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld game application device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include a touchscreen input. The touchscreen can be capacitive touchscreen, a resistive touchscreen, or other type of touchscreen technology that is configured to receive user input through tactile inputs from the player. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise a hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads game media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
a data store that stores player interaction data associated with control by a player of one or more characters in a video game; and
a computing system in electronic communication with the data store and configured to execute computer-readable instructions that configure the computing system to:
retrieve player interaction data from the data store as at least a portion of training data for two or more machine learning models, wherein the training data identifies game information associated with each of a plurality of instances in which the player spoke a first utterance while controlling an in-game character in the video game, wherein the game information associated with each individual instance of the first utterance comprises at least (a) control input received, subsequent to the individual instance of the first utterance, from a control device of the player and (b) associated game state information when the first utterance was spoken in the individual instance;
train the two or more machine learning models to learn in-game character actions associated with the first utterance based on the training data, wherein the in-game character actions learned by the two or more machine learning models for the first utterance differ between at least two different game states, wherein the two or more machine learning models include a first model and a second model, wherein the first model is trained to associate an immediate in-game action with the first utterance, wherein the second model is trained to infer a goal associated with the first utterance;
subsequent to training the two or more machine learning models, execute an instance of the video game, wherein the player controls a first character in the instance of the video game using a first control device, wherein a second character in the instance of the video game is controlled by the system as a non-player character;
during execution of the instance of the video game, receive indication that the first utterance is spoken by the player;
based on the first utterance spoken by the player, provide at least current game state information as input to the two or more machine learning models;
determine at least one in-game action to be performed by the second character in the instance of the video game based on output of at least one of the two or more machine learning models; and
cause the second character in the instance of the video game to perform the at least one in-game action.

2. The system of claim 1, wherein the at least one in-game action to be performed by the second character in the instance of the video game based on the output of the at least one of the two or more machine learning models comprises a series of actions to be performed by the second character to accomplish an inferred goal determined by the second model.

3. The system of claim 1, wherein the second model is based at least in part on an inverse reinforcement learning algorithm.

4. The system of claim 1, wherein the control device comprises at least one of a game controller, a keyboard or a mouse.

5. The system of claim 1, wherein the instance of the video game includes a plurality of characters that are controlled by the system as non-player characters, and wherein the computing system is further configured to determine that the first utterance applies to the second character based on a portion of the utterance.

6. The system of claim 1, wherein the second character is a team member of a team that includes the first character within the instance of the video game.

7. The system of claim 1, wherein causing the second character in the instance of the video game to perform the at least one in-game action comprises causing the second character to behave similarly to behavior of a player-controlled character as captured in the training data.

8. A computer-implemented method comprising:
under the control of a computer system comprising computer hardware, the computer system configured with computer executable instructions:
obtaining training data for one or more machine learning models, wherein the training data comprises game information associated with each of a plurality of instances in which a player of a video game spoke at least a first utterance while controlling an in-game character in the video game, wherein the game information associated with each individual instance of the first utterance comprises at least one of control input received from a control device of the user or an in-game action performed by the in-game character subsequent to the individual instance of the first utterance, and wherein the game information further includes data representing a game state when the first utterance was spoken in the individual instance;
training the one or more machine learning models to learn in-game character actions associated with the first utterance based on the training data;
subsequent to training the one or more machine learning models, executing an instance of the video game, wherein the player controls a first character in the instance of the video game using a first control device, wherein a second character in the instance of the video game is a non-player character that is primarily controlled without player input;
during execution of the instance of the video game, receiving indication that the first utterance is spoken by the player;
based on the first utterance spoken by the player, providing at least current game state information as input to the one or more machine learning models;
determining at least one in-game action to be performed by the second character in the instance of the video game based on output of the one or more machine learning models;
causing the second character in the instance of the video game to perform the at least one in-game action;
receiving feedback from the player regarding whether the at least one in-game action performed by the second character was desired by the player when speaking the first utterance; and
updating at least one of the one or more machine learning models based on the feedback.

9. The computer-implemented method of claim 8, further comprising executing a training environment within the video game, wherein the training environment presents simplified game states for player interaction, and wherein the training data is collected based on control input and utterances received from the player with the training environment.

10. The computer-implemented method of claim 8, wherein the one or more machine learning models are trained to control one or more non-player characters in response to each of a plurality of utterances.

11. The computer-implemented method of claim 10, wherein each of the plurality of utterances is one or more vocal sounds determined by the player and conveyed to the one or more machine learning models based in part on the player speaking the plurality of utterances during a training phase.

12. The computer-implemented method of claim 8, wherein executing the instance of the video game comprising executing a hosted instance of the video game, wherein an application host system interacts with a game application executed on a computing device utilized by the player.

13. A non-transitory computer-readable storage medium having stored thereon computer-readable instructions that, when executed, configure a computing system to perform operations comprising:
   training one or more machine learning models to learn in-game character actions associated with each of a plurality of player-defined utterances;
   subsequent to training the one or more machine learning models, executing an instance of a video game, wherein a player controls a first character in the instance of the video game using a first control device, wherein a second character in the instance of the video game is a non-player character that is primarily controlled without player input;
   during execution of the instance of the video game, receiving indication that a first utterance is spoken by the player, wherein the first utterance is one of the plurality of player-defined utterances;
   based on the first utterance spoken by the player, providing at least current game state information of the instance of the video game as input to the one or more machine learning models;
   determining at least one in-game action to be performed by the second character in the instance of the video game based on output of the one or more machine learning models;
   causing the second character in the instance of the video game to perform the at least one in-game action in response to the first utterance;
   receiving feedback from the player regarding whether the at least one in-game action performed by the second character was desired by the player when speaking the first utterance; and
   updating at least one of the one or more machine learning models based on the feedback.

14. The non-transitory computer-readable storage medium of claim 13, wherein the one or more machine learning models include a first model and a second model, wherein the first model is a classifier that maps each of the plurality of utterances to different in-game actions that are dependent on an associated game state, wherein the second model is an inverse reinforcement learning model configured to determine a series of in-game actions to reach an inferred goal associated with a given utterance.

15. The non-transitory computer-readable storage medium of claim 13, wherein the second character is a team member of a team that includes the first character within the instance of the video game.

16. The non-transitory computer-readable storage medium of claim 13, wherein the operations further comprise executing a training environment within the video game, wherein the training environment presents simplified game states for player interaction, and wherein training data for training the one or more machine learning models is collected based on control input and utterances received from the player with the training environment.

* * * * *